(12) United States Patent
Schaer et al.

(10) Patent No.: US 12,738,776 B2
(45) Date of Patent: Sep. 15, 2026

(54) ENERGY TRANSFER MODULE, TRANSMITTING UNIT, ENERGY TRANSFER SYSTEM AND METHOD

(71) Applicant: Hilti Aktiengesellschaft, Schaan (LI)

(72) Inventors: Roland Schaer, Grabs (CH); Lukas Hornscheidt-Schrittwieser, Dietikon (CH); Dan Mugioiu, Dietikon (CH); Markus Christian Wegmann, Dietikon (CH); Noah Hüsser, Lenzburg (CH)

(73) Assignee: Hilti Aktiengesellschaft, Schaan (LI)

( * ) Notice: Subject to any disclaimer, the term of this patent is extended or adjusted under 35 U.S.C. 154(b) by 926 days.

(21) Appl. No.: 18/014,468

(22) PCT Filed: Jul. 2, 2021

(86) PCT No.: PCT/EP2021/068394

§ 371 (c)(1),
(2) Date: Jan. 4, 2023

(87) PCT Pub. No.: WO2022/012980

PCT Pub. Date: Jan. 20, 2022

(65) Prior Publication Data

US 2023/0261530 A1 Aug. 17, 2023

(30) Foreign Application Priority Data

Jul. 13, 2020 (EP) .................................... 20185450

(51) Int. Cl.
*H02J 50/90* (2016.01)
*H02J 7/04* (2006.01)
(Continued)

(52) U.S. Cl.
CPC ................ *H02J 50/90* (2016.02); *H02J 7/04* (2013.01); *H02J 50/12* (2016.02); *H02J 50/402* (2020.01); *H02J 50/80* (2016.02)

(58) Field of Classification Search
CPC .......... H02J 50/12; H02J 50/402; H02J 50/80; H02J 50/90; H02J 7/04
(Continued)

(56) References Cited

U.S. PATENT DOCUMENTS

| | | | |
|---|---|---|---|
| 7,262,700 | B2 | 8/2007 | Hsu et al. |
| 2006/0202665 | A1 | 9/2006 | Hsu et al. |

(Continued)

FOREIGN PATENT DOCUMENTS

| | | | |
|---|---|---|---|
| EP | 3148052 | A1 | 3/2017 |
| WO | WO 2018194223 | A1 | 10/2018 |
| WO | WO 2022/012979 | | 1/2022 |

OTHER PUBLICATIONS

International Search Report of PCT/EP2021/068394 dated Sep. 9, 2021.

(Continued)

*Primary Examiner* — Hal Kaplan
(74) *Attorney, Agent, or Firm* — Davidson Kappel LLC

(57) ABSTRACT

An energy transfer module for transferring energy to a mobile device, in particular a handheld power tool, wherein the energy is transferred wirelessly, including at least a first and a second transmitting coil. The first transmitting coil can be operated with a first alternating current and the second transmitting coil can be operated with a second alternating current, wherein the energy transfer module is configured so that, at least during an energy transfer phase of the energy transfer module, the absolute value of the relative phase angle (beta) of the currents flowing in the first and second transmitting coils is not more than 45° or the relative phase angle (beta) is minimized. A transmitting unit, to an energy transfer system and to a method for operating at least one of the aforementioned apparatuses.

22 Claims, 2 Drawing Sheets

(51) Int. Cl.

| | |
|---|---|
| ***H02J 50/12*** | (2016.01) |
| ***H02J 50/40*** | (2016.01) |
| ***H02J 50/80*** | (2016.01) |

(58) Field of Classification Search

USPC .......................................................... 307/104

See application file for complete search history.

(56) References Cited

U.S. PATENT DOCUMENTS

| | | | |
|---|---|---|---|
| 2009/0106567 | A1 | 4/2009 | Baarman et al. |
| 2012/0256585 | A1 | 10/2012 | Partovi et al. |
| 2013/0069444 | A1 | 3/2013 | Waffenschmidt et al. |
| 2014/0368163 | A1 | 12/2014 | Ho et al. |
| 2015/0236513 | A1 | 8/2015 | Covic et al. |
| 2015/0236526 | A1 | 8/2015 | Jadidian et al. |
| 2016/0035486 | A1 | 2/2016 | Turki et al. |
| 2020/0127494 | A1 | 4/2020 | Stevens et al. |

OTHER PUBLICATIONS

Washak James et al:“Development of an Automatic Bidirectional Wireless Charging System for Mobile Devices”. IEEE, Jun. 18, 2019, pp. 380-384.

alpha
d1
d2
utx1
utx2
t beta
itx1
itx2
t 110
starting
112
waiting
100
k = 1.. n:
$u_{txk}$, $i_{txk}$, $d_k$ → $n_{active}$
114
search
$n_{active}$ > $n_{active,min}$?
No
checking
116
Yes
energy transfer
118
Yes
decision
No
120

ENERGY TRANSFER MODULE, TRANSMITTING UNIT, ENERGY TRANSFER SYSTEM AND METHOD

The present invention relates to an energy transfer module for transferring energy to a mobile device. The invention also relates to a transmitting unit for such an energy transfer module, to an energy transfer system and to a method for operating an energy transfer system, an energy transfer module and/or a transmitting unit.

SUMMARY OF THE INVENTION

In order to be able to operate a mobile device, for example a battery-operated handheld power tool, it is generally necessary to charge an energy store of the mobile device in advance. This is usually carried out by means of an energy transfer system which is specially tailored to the mobile device and to which the mobile device is coupled for charging. In some mobile devices and the associated energy transfer systems, the coupling is effected wirelessly. Such pairs of mobile devices and energy transfer systems require relatively precise positioning and alignment of the mobile device relative to the energy transfer system in order to be able to carry out energy transfer or charging. Inadequate positioning and/or alignment can lead to significant, undesirable radiated interference. Overall, this is highly unsatisfactory for a user of the mobile device or the energy transfer system, if not even impermissible in the respective jurisdictions.

It is an object to the present disclosure to offer conveniently usable apparatuses that allow energy to be transferred with high power to a mobile device. Furthermore, it is an object of the present invention to offer a method for operating such an apparatus, by means of which it is likewise possible to transfer energy with high power.

The present invention provides an energy transfer module for transferring energy to a mobile device, in particular a handheld power tool, wherein the energy is transferred wirelessly, comprising at least a first and a second transmitting coil, wherein the first transmitting coil can be operated with a first alternating current and the second transmitting coil can be operated with a second alternating current, wherein the energy transfer module is configured in such a way that, at least during an energy transfer phase of the energy transfer module, the absolute value of the relative phase angle of the currents flowing in the first and second transmitting coils is not more than 45°, particularly preferably not more than 15°.

The two currents preferably have a relative phase angle of 0°, that is to say the two currents are in phase with one another.

Accordingly, following the same inventive concept, the present invention also provides an energy transfer module for transferring energy to a mobile device, in particular a handheld power tool, wherein the energy is transferred wirelessly, comprising at least a first and a second transmitting coil, wherein the first transmitting coil can be operated with a first alternating current and the second transmitting coil can be operated with a second alternating current, wherein the energy transfer module is configured, at least during an energy transfer phase of the energy transfer module, to minimize the absolute value of the relative phase angle of the currents flowing in the first and second transmitting coils.

Overall, the invention is based on the concept that at least extensive, possibly complete, synchronization of the phases of the two currents makes it possible to enlarge the spatial energy transfer area within which energy can be transferred to the mobile device by at least one of the two transmitting coils. Interference transmissions between the two transmitting coils and associated power losses can be reduced. The requirements for the accuracies with which the mobile device must be positioned and/or aligned relative to the energy transfer module can thus be reduced, as a result of which the ease of use and the permissibly transferable power can be increased considerably. In this case, the energy can be transferred to the mobile device via the first and/or the second transmitting coil. The energy transfer can in particular serve to charge an energy store of the mobile device.

Due to the relatively small, in particular vanishingly small, relative phase angle, energy losses during energy transfer can also be reduced and the energy transfer efficiency can be increased.

The energy transfer module can in particular be configured to transfer energy to a handheld power tool, in particular with a rechargeable energy store. The energy is preferably transferred for the purpose of transferring energy required to operate the mobile device. In particular, the energy transfer module can be configured to transfer high powers, for example from 0.1 kW up to 2.5 kW, for example. The energy transfer module is therefore also particularly suitable for use in building construction and/or civil engineering, for example for transferring energy to, in particular battery-operated, drilling machines, hammer drills, chiseling machines, sawing machines, measuring instruments for building construction and/or for civil engineering, such as total stations or rotating lasers, and/or any combination of such devices. It is conceivable in this case that, with such use of the energy transfer module, energy is transferred to a plurality of these mobile devices at the same time or at least quasi-simultaneously.

The energy transfer phase can correspond to a state in which both transmitting coils are active, so that the relative phase angle can be determined. However, the energy transfer module can also be configured such that energy can also be transferred when only one of the two transmitting coils is active.

Radiated interference can further be avoided if the energy transfer module is configured in such a way that, at least during the energy transfer phase, the RMS current values of the currents flowing in the first and second transmitting coils differ by no more than 10 percent, particularly preferably by no more than 6 percent, and/or by no more than 0.3 A. Particularly preferably, the RMS values differ by less than 1 percent and can in particular be the same. Alternatively or additionally, the amplitudes of the currents and/or of voltages assigned to the first and second alternating currents can analogously correspond or at least differ by no more than 10 percent, particularly preferably by no more than 1 percent.

The power of the energy transfer can be controlled particularly easily if the energy transfer module is configured in such a way that, at least during the energy transfer phase, the voltages respectively assigned to the first and/or second alternating current are pulse-width-modulated, preferably square wave or at least substantially square wave. In particular, the transmitted RMS power and the relative phase angle between the currents flowing through the first and second transmitting coils can be controlled via the respective pulse width of the respective assigned voltage. The phase angle between the two assigned voltages can be determined and/or set on the basis of the time offset of the centers of the respectively corresponding pulses of the respectively assigned voltage.

The first and second transmitting coils can each be integrated in at least one electrical resonant circuit with a respective resonant frequency. The resonant frequencies of the resonant circuits can preferably differ by no more than 10 percent, particularly preferably by no more than 1 percent. At least one of the resonant circuits can have the respective transmitting coil and an electrical capacitance. Operating at least one of the transmitting coils, preferably all of the transmitting coils, at resonance makes it possible to reduce or even entirely avoid radiated interference, in particular in harmonics of the respective resonant frequency. Apparent powers can also be reduced.

If at least one of the transmitting coils and/or preferably all of the transmitting coils can be activated and deactivated individually, considerable energy savings can be achieved and/or radiated interference can be reduced by only or by at least primarily activating those of the transmitting coils in whose vicinity, in particular in whose spatial energy transfer area, the mobile device is located. For this purpose, the energy transfer system can have a control unit which is configured to select and in particular to subsequently activate and/or deactivate one or more of the transmitting coils.

A transmitting unit for an energy transfer module according to the invention also falls within the scope of the invention, wherein the transmitting unit has at least one transmitting coil that can be controlled with an alternating current and a communication interface, via which at least one piece of information relating to a target phase angle of the current flowing in the transmitting coil or a relative target phase angle and/or a target pulse width of the voltage and/or an RMS value of the current flowing through the transmitting coil and/or the phase angle of the current can be transmitted. Such a transmitting unit makes it possible to easily extend the spatial energy transfer area, within which energy can be transferred to the mobile device. This also makes it possible to increase the convenience for a user. The communication interface may be in the form of a wireless and/or wired interface. Active power to be transferred via the transmitting coil can also be transferred via the communication interface, in particular if it is wired. For example, the communication interface may be in the form of an electrical connection element and/or have an electrical connection element. The communication interface can correspond to an input of the alternating current belonging to the transmitting coil. It can be configured to feed a feed current, preferably an alternating current feed current, into the transmitting unit, wherein the alternating current which can be used to operate the transmitting coil can preferably be generated from the feed current. The target phase angle and/or the relative target phase angle can be coded in the feed current.

The communication interface can also be configured to activate and/or deactivate the transmitting coil of the transmitting unit and/or to transmit an activation signal and/or a deactivation signal which can be used to activate and/or deactivate the transmitting coil of the transmitting unit. The energy transfer module can therefore be expanded in a modular manner by the transmitting unit.

If the energy transfer module and/or the transmitting unit has/have at least one connector for mutual, in particular reversibly detachable, connection, the energy transfer area suitable for transferring energy can be enlarged and/or reduced in a particularly simple manner. For example, a plurality of transmitting coils can be arranged within a polygon, in particular within a rectangle, by combining an energy transfer module with one or more transmitting units. For example, an arrangement is conceivable in which the transmitting coils of the energy transfer module and the at least one transmitting unit are ultimately arranged in a 3×3 matrix.

The energy transfer module and the at least one transmitting unit can be in a master-slave relationship. In this case, the energy transfer module can act as a master and the at least one transmitting unit can act as a slave. In particular, the energy transfer module can be designed, as a master, to control a phase angle and/or a strength of the current and/or the voltage which can be used to operate the at least one transmitting coil of the transmitting unit.

The scope of the invention also includes an energy transfer system comprising at least one energy transfer module according to the invention and at least one transmitting unit according to the invention. Such an energy transfer system can have a modular structure. The spatial energy transfer area, in which energy can be transferred to a mobile device, can thus be enlarged and/or reduced in a modular manner.

In particular, it is conceivable to transfer energy to one or more mobile devices at the same time or at least quasi-simultaneously. In particular, it is conceivable in this case that each mobile device can be supplied with energy by in each case its own set of one or more of the transmitting coils of the energy transfer system. In order to reduce radiated interference, one or more of the transmitting coils can be selectively activated and/or selectively deactivated, in particular on the basis of the location and/or the position of at least one of the mobile devices.

The scope of the invention also includes a method for operating an energy transfer system according to the invention, an energy transfer module according to the invention and/or a transmitting unit according to the invention, wherein the energy transfer system, the energy transfer module and/or the transmitting unit has/have a total of at least two transmitting coils, each operable by means of an alternating current, at least comprising the steps of a. detecting and locating a mobile device;
b. activating at least one of the transmitting coils on the basis of the detection and/or the localization of the mobile device;
c. monitoring a transferred active power of at least one activated transmitting coil and/or, if at least the two transmitting coils are activated, a relative phase angle of the currents flowing in the first and second transmitting coils.

In order to determine and/or monitor the relative phase angle, reference can be made to a reference phase, for example of the current flowing through a specific one of the activated transmitting coils.

In this case, the method according to the invention is based on the idea of offering the largest possible spatial energy transfer area in which energy can be transferred to one or more mobile devices and thereby reducing the requirements for the accuracies for positioning and/or for aligning the at least one mobile device relative to the energy transfer system, energy transfer module and/or the transmitting unit.

To this end, a multiplicity of transmitting coils can initially be provided.

The at least one mobile device is detected and located.

Transmitting coils that are sufficiently close to the mobile device can then be activated. Transmitting coils that are relatively far away from the mobile device can be deactivated.

The location and/or the position of the mobile device can then be monitored. This can take place using the strength of an input current, the strength of a power and/or using the relative phase angle.

Transmitting coils which have a smaller transmission range than a reception range of at least one receiving coil of the mobile device can preferably be used. In other words, the size ratios and/or the radiation characteristics of the transmitting coils and/or the reception characteristics of the at least one receiving coil may have been and/or may be selected such that energy can be transferred from a plurality of transmitting coils to the at least one receiving coil.

Continuous energy transfer, even after the mobile device has been moved, at least within the energy transfer area, can be achieved if at least one inactive transmitting coil is activated in addition to the activation according to the second step. A previously inactive transmitting coil, which is currently as close as possible to the mobile device, is preferably activated in this case.

In order to determine a suitable, currently inactive transmitting coil in a time-saving manner, the inactive transmitting coils can be tried out cyclically. This can be easily achieved by activating, preferably one after the other, that inactive transmitting coil which has been inactive for the longest time in each case. In this respect, the activation can only take place for such a short time that it is possible to determine whether or not energy can be transferred from the respectively activated transmitting coil to the mobile device. This principle can be further refined by first selecting a subgroup of inactive transmitting coils within which the transmitting coil that has been inactive for the longest time in each case is activated. For example, initially only the inactive transmitting coils that are adjacent to the currently activated transmitting coils can be activated and, in particular, checked.

By moving the mobile device, it can leave the transmission range of one of the transmitting coils. It is thus also possible to save energy and avoid radiated interference if an active transmitting coil is deactivated during the monitoring in accordance with step c.

A selection criterion for this can consist in deactivating that active transmitting coil whose transferred active power is the lowest of all active transmitting coils in each case and/or whose transferred active power falls below a minimum active power.

The voltage assigned to the alternating current can preferably be pulse-width-modulated.

In order to control the transfer of energy, the method can provide for a phase angle and/or a duty factor of at least one assigned voltage to be set.

The size of the energy transfer area can be adapted as required by coupling a further energy transfer module and/or a further transmitting unit to the energy transfer system, the energy transfer module and/or the transmitting unit, respectively. In particular, a large-area system for transferring energy, in particular for charging energy stores of one or more mobile devices, can be set up in a particularly simple manner as a result.

A further increase in convenience can be achieved if a piece of state information relating to the mobile device is transmitted from the mobile device to the energy transfer system, the energy transfer module and/or the transmitting unit, respectively. The state information can correspond, for example, to a piece of information relating to a state of charge, for example a cell voltage, of the energy store of the mobile device. The transmission can take place wirelessly. For this purpose, the mobile device can have a communication module. The communication module can use a wireless and preferably energy-saving communication protocol such as "Bluetooth Low Energy" or "Zigbee". The energy transfer system preferably has a corresponding communication module which particularly preferably uses the same communication protocol as the communication module of the mobile device.

Further features and advantages of the invention emerge from the following detailed description of exemplary embodiments of the invention, with reference to the figures of the drawing, which shows details essential to the invention, and from the claims. The features shown there are not necessarily to be understood as true to scale and are shown in such a way that the special features according to the invention can be made clearly visible. The various features can be implemented individually in their own right or collectively in any combination in variants of the invention.

BRIEF DESCRIPTION OF THE DRAWINGS

In the schematic drawing, exemplary embodiments of the invention are shown and explained in more detail in the following description.

In the drawing.

DETAILED DESCRIPTION

To make the invention easier to understand, the same reference signs are used in each case in the following figures for functionally corresponding elements.

Figure 1:
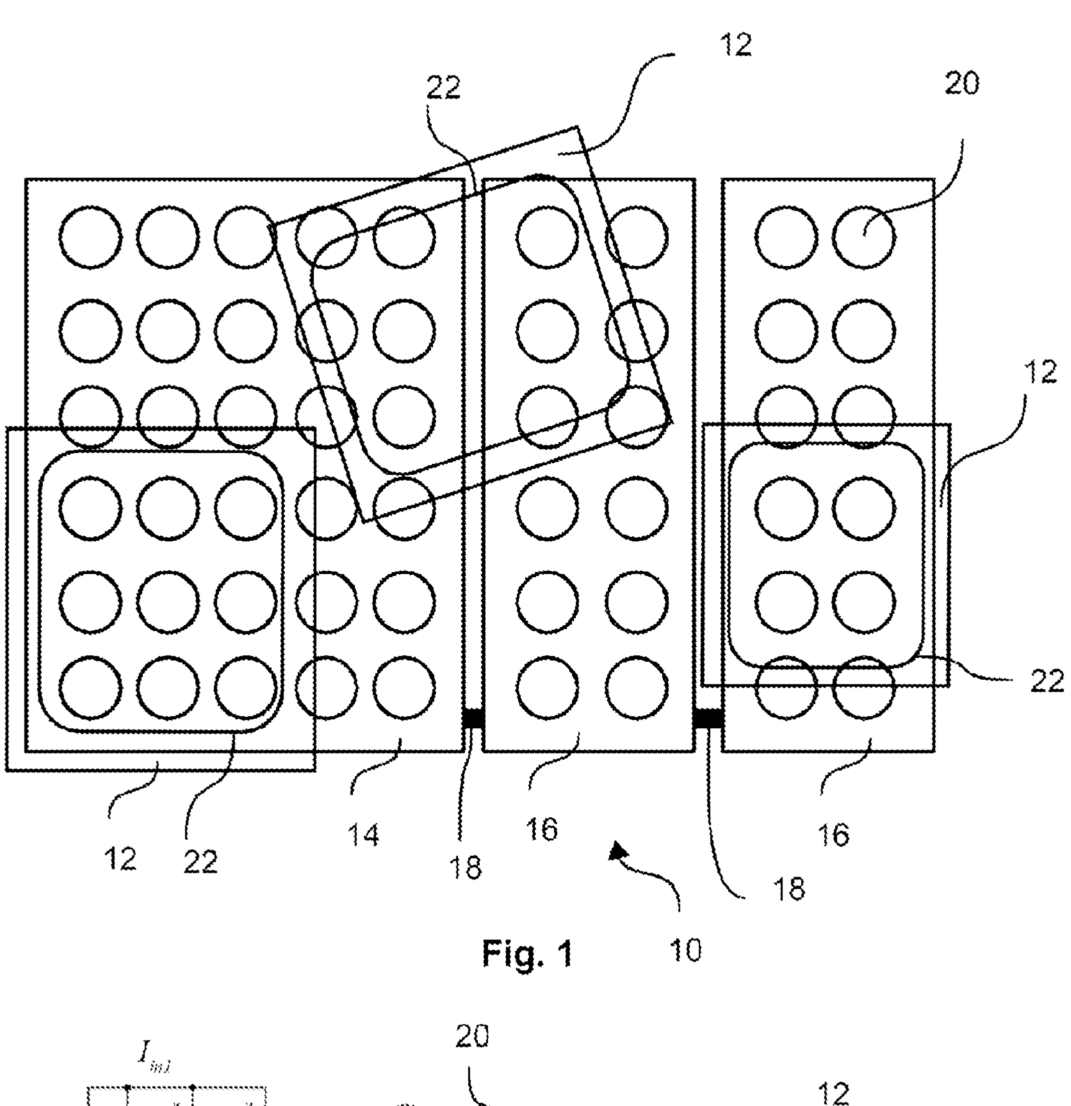
FIG. 1 shows a schematic illustration of an energy transfer system having a plurality of mobile devices.

FIG. 1 shows an energy transfer system 10, on which one or more, three by way of example in FIG. 1, mobile devices 12 are arranged for energy transfer. In particular, energy stores of the mobile devices 12 are intended to be charged by means of the energy transfer system 10. The mobile devices 12 can be, for example, battery-operated hammer drills, chiseling machines, drilling machines or other battery-operated handheld power tools or a battery block for such a machine.

The energy transfer system 10 has an energy transfer module 14 as well as two transmitting units 16. The transmitting units 16 are coupled to the energy transfer module 14 via communication interfaces 18.

The communication interfaces 18 have electrical connection elements, in particular plug connectors and sockets of complementary design. The transmitting units 16 can be supplied with electrical energy from the energy transfer module 14 via the communication interfaces 18. In addition, a piece of information relating to a target phase angle can be transmitted from the energy transfer module 14 to the respective transmitting unit 16 via the communication interfaces 18. In particular, at least one feed current can be transferred from the energy transfer module 14 to the transmitting units 16 via the communication interface 18. A respective target phase angle can be coded by a phase angle of the feed current. For example, the phase angle of the feed current can correspond to the target phase angle to be set or to be achieved in each case.

The energy transfer module 14 and the transmitting units 16 each have a plurality of transmitting coils 20, only one transmitting coil 20 of which is marked with a reference sign in order to simplify the illustration. The transmitting coils 20 are each distributed in a flat, in particular matrix-like, manner in the energy transfer module 14 or in the respective transmitting units 16.

The mobile devices 12 are configured in particular for electromagnetic, in particular inductive, coupling to the energy transfer system 10. The mobile devices 12 each have a receiving coil 22. The receiving coils 22 are configured to receive energy emitted by at least one of the transmitting coils 20, provided that they are located in a respective spatial energy transfer area of the respective transmitting coil 20.

It can be seen that the mobile devices 12 are freely placed and freely oriented on the energy transfer system 10, in particular for energy transfer.

It can also be seen that the receiving coils 22 each span a larger area than one of the transmitting coils 20 in each case. In other words, the receiving coils 22 are larger than the transmitting coils 20. In particular, the receiving coils 22 are larger than the respective spatial energy transfer areas of the respective transmitting coils 20. For example, the mobile device 12 placed furthest to the left in FIG. 1 and in particular its receiving coil 22 span nine transmitting coils 20.

The energy transfer system 10 has a modular structure. Further transmitting units (not illustrated in FIG. 1) and preferably further energy transfer modules (also not illustrated in FIG. 1) can be connected to the energy transfer module 14 by means of the communication interface 18, with the result that the energy transfer system 10 and in particular the energy transfer area of the energy transfer system 10 are enlarged. One or both transmitting units 16 can also be decoupled, in particular from the communication interface 18, with the result that the energy transfer system 10 and in particular its energy transfer area are reduced.

Figures 3A, 3B, 4:
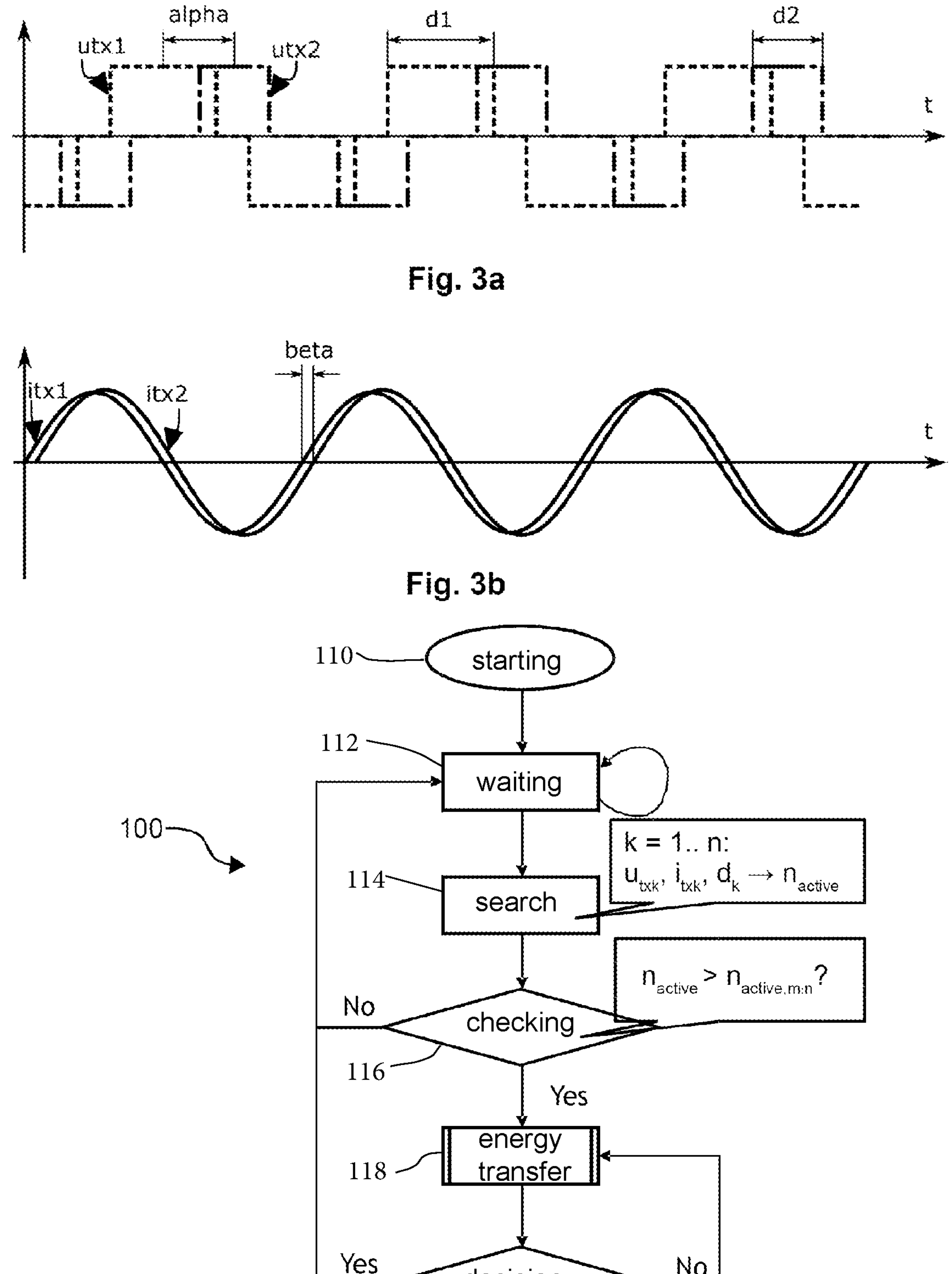
FIG. 3*a* shows a schematic illustration of a voltage-time diagram.
FIG. 3*b* shows a schematic illustration of a current-time diagram.
FIG. 4 shows a flowchart of a method.

The energy transfer system 10, in particular its energy transfer module 14, has—not illustrated in FIG. 1 in each case—a programmable control unit with a memory unit, in which program code for carrying out the method according to the invention to be described in yet more detail with reference to FIG. 4 is stored, and with electrical switching elements controllable by means of program code. The control unit is configured in particular to control the transmitting coils 20 in accordance with the method according to the invention. It is conceivable that, as an alternative or in addition, the transmitting units 16 each have their own correspondingly configured control units for controlling their respective transmitting coils 20. In this case, the control operations can be synchronized by the control units via the communication interfaces 18.

The circuit design of the energy transfer module 14 and of the transmitting units 16 is explained in more detail below with the aid of a simplified exemplary embodiment.

Figure 2:
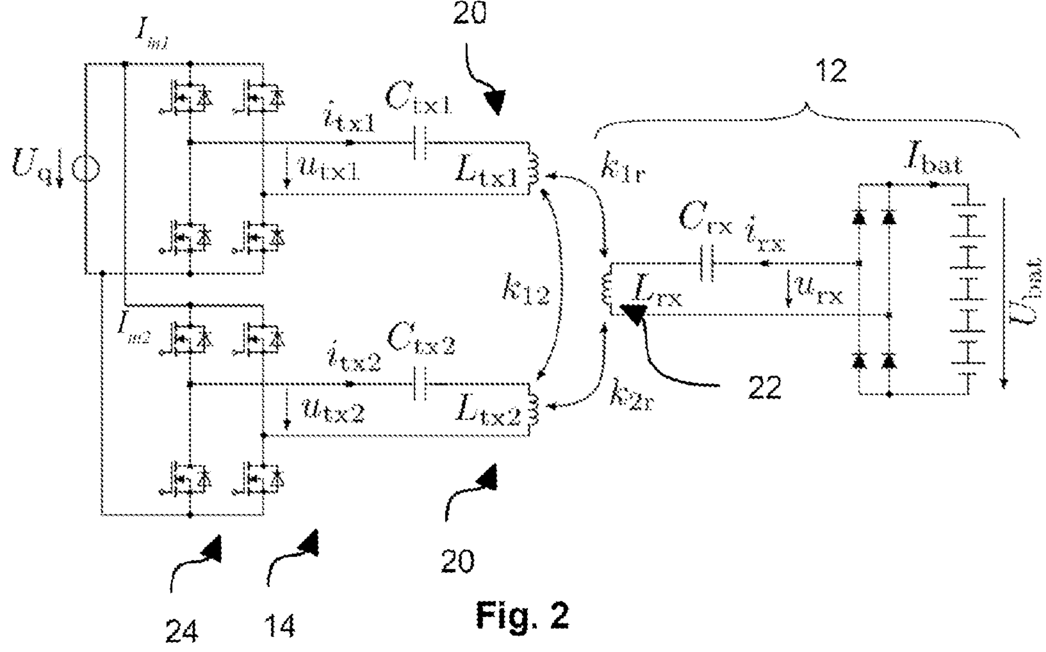
FIG. 2 shows a simplified basic circuit diagram of an energy transfer module with a mobile device coupled to it.

FIG. 2 shows a simplified basic circuit diagram of an energy transfer module 14 having two transmitting coils 20, which can be operated with a first and a second alternating current, and their transmitting inductances Ltx1 and Ltx2.

The energy transfer module 14 and the transmitting units 16 as well as the mobile devices 12 of the preceding exemplary embodiment have a structure that is analogous to the exemplary embodiment to be described now.

A mobile device 12 is inductively coupled, via the transmitting coils 20, to the energy transfer module 14 for energy transfer. For this purpose, the mobile device 12 has a receiving coil 22 with a receiving inductance Lrx. The transmitting inductance Lrx is coupled to the transmitting inductances Ltx1 and Ltx2 with a coupling factor k1_r_ and k2_r_, respectively. Between the transmitting inductances Ltx1 and Ltx2, there is, preferably low, coupling with a coupling factor k12.

The transmitting inductances Ltx1 and Ltx2 as well as the receiving inductance Lrx are each integrated into separate resonant circuits. For this purpose, the resonant circuits have capacitances Ctx1, Ctx2 and Crx, respectively. All resonant circuits have the same resonant frequency.

Energy is supplied to the transmitting inductances Ltx1 and Ltx2 via a DC/AC voltage converter 24, only individual components of which, in particular power semiconductors, are shown in the basic circuit diagram according to FIG. 2 for the sake of simplicity.

The DC/AC voltage converter 24 is fed with the feed voltage Uq by a voltage source. The feed voltage Uq is 24 V. The DC/AC voltage converter 24 generates voltages utx1 and utx2. To do this, it receives input currents Iin1 and Iin2.

Currents itx1 and itx2 flow through the resonant circuits of the transmitting coils 20.

An induction voltage urx and an induction current irx are generated in the resonant circuit of the mobile device 12 by inductive energy transfer. With the induction voltage urx and/or the induction current irx, as illustrated by way of example in FIG. 2, an energy store can be charged with the charging voltage Ubat and the charging current Ibat via a rectifier circuit, in particular having power diodes.

As an alternative or in addition, the energy store can also be charged using other interconnections, in particular having a charging control circuit. It is also conceivable that further and/or different functional groups of the mobile device 12 can be supplied with energy by means of the induction voltage urx and/or the induction current irx.

The maximum charging power achieved by the energy transfer module 14, in particular in conjunction with the mobile device 12, is 100 W in this exemplary embodiment. The charging current Ibat is 5 A and the charging voltage Ubat is 20 V.

In addition, the energy transfer system 10, in particular the energy transfer module 14 and for each of the transmitting coils 20, has analog-to-digital converter units likewise not illustrated in FIG. 1 for reasons of simplicity. The input currents Iin1, Iin2, the voltages utx1, utx2 and/or the currents itx1, itx2 can be digitized and/or measured by means of the analog-to-digital converter units.

FIG. 3_a_ shows a schematic illustration of the time profile of the voltages utx1 and utx2. Both voltages utx1 and utx2 are square-wave AC voltages. They have a square-wave or an at least substantially square-wave voltage profile. The voltage utx1 has a pulse width d1. The voltage utx2 has a pulse width d2. The pulse widths d1 and/or d2, in conjunction with the frequencies of the voltages utx1 and utx2 respectively, result in specifically adjustable duty factors of the voltages utx1, utx2 in each case. The voltages utx1 and utx2 have a phase angle alpha relative to one another. The phase angle alpha can be measured in this respect as a relative time difference, for example expressed as a proportion in relation to a period duration, of the respective midpoints between a respective rising edge and the associated next falling edge of the positive half-wave of the respective one of the voltages utx1, utx2.

The amplitudes of the voltages utx1 and utx2 are the same or at least substantially the same in this exemplary embodiment.

FIG. 3*b* illustrates—likewise in a schematic illustration—a time profile of the currents itx1 and itx2 belonging to the voltages utx1, utx2 according to FIG. 3*a*.

It can be seen in particular that the currents itx1 and itx2 have a relative phase angle beta relative to one another. The relative phase angle beta can be measured in this case as a relative time difference, for example expressed as a proportion in relation to a period duration, of two directly successive rectified zero crossings of the respective current itx1, itx2.

The relative phase angle beta is less than 15°.

The frequencies of the currents itx1 and itx2 match or at least substantially match.

The RMS values of the currents itx1 and itx2 also match or at least substantially match.

FIG. 4 now shows a method 100 for operating the energy transfer system 10.

The method 100 is explained in more detail below with reference to the elements described in the preceding FIGS. 1, 2, 3*a* and 3*b* and with recourse to the reference signs used there.

The method 100 is used in particular to control the transmitting coils 20 of the energy transfer module 14 and of the transmitting units 16.

It comprises the following steps:

A starting step 110, during which the energy transfer system 10 is put into a general operating state, is first of all followed by a waiting step 112.

In the waiting step 112, after expiry of a predetermined period of time, for example 5 seconds, after the beginning of the waiting step 112, a search step 114 is triggered. During this waiting time, the energy transfer system 10 or at least one of its elements can be put into an, in particular energy-saving, idle state.

The search step 114 serves to detect and locate at least one mobile device 12 located in the energy transfer area of the energy transfer system 10. The detection and the localization take place indirectly in this case in that it is determined whether and, if applicable, for which transmitting coils 20 a receiving coil 22 is located within an energy transfer area of the respective transmitting coil 20.

In this case, a receiving coil 22 is detected by sequentially checking the resonant circuits associated with the transmitting coils 20 for detuning.

In detail, for this purpose, within the search step 114, the following sub-steps are carried out sequentially for each one of the total of n transmitting coils 20 or for each of n associated resonant circuits, where k is used to denote the index number of the respective resonant circuit and the reference signs Iink, utxk, itxk and dk should be understood in an analogous manner to Iin1, utx1, itx1 and d1 in relation to a transmitting coil 20 denoted with index k and the associated resonant circuit:

- 114.1 Resonant circuit k is activated with a duty factor of 1%. For this purpose, its voltage utxk is set to this duty factor of 1% and the pulse width dk associated with this duty factor. The frequency of the voltage utxk is set to the resonant frequency of the resonant circuit k.
- 114.2 The process waits for decay of possible transients of an associated current itxk. For this purpose, the process waits for a predefined period of time, for example.
- 114.3 The current itxk is measured and compared with a predefined limit value.
- 114.4 The result of the comparison is buffered.
- 114.5 The resonant circuit k is deactivated by switching off the voltage utxk.

Finally, the buffered comparison results are evaluated and, in particular, the number $n_{active}$ of transmitting coils 20 used by the mobile device or devices 12 and therefore to be activated is counted in the form of the number of positive comparison results.

It is conceivable that a type identification takes place in this step such that only mobile devices 12 of one or more specific types are taken into account. This also makes it possible to detect and sort out interfering objects, for example metallic foreign bodies, to which no energy should be transferred. In this respect, it is also conceivable not to activate or deactivate the relevant transmitting coils 20 when an interfering object is detected.

In this respect, it is also conceivable that the energy transfer module 14 and/or the transmitting unit 16 is/are configured to carry out a type identification or an interfering object identification.

In a subsequent checking step 116, it is checked whether the number nactive exceeds a predefined minimum number nactive, min. The minimum number nactive, min can be 1, for example. A higher minimum number nactive, min can be selected in this case in order to improve the measurement error tolerance when detecting and locating the mobile device(s) 12.

If the number nactive is too low, for example because there is no mobile device 12 in the energy transfer area of the energy transfer system 10, the method 100 is continued with the waiting step 112. The energy transfer system 10 thus waits, for example, for mobile devices 12 to be charged.

Otherwise, the method 100 is continued with an energy transfer step 118.

The energy transfer step 118 is used to actually transfer energy to the mobile device(s) 12.

The energy transfer step 118 is configured such that the currents itxk of all active transmitting coils 20 or of all associated resonant circuits are regulated in such a way that they have the same RMS current values as far as possible or at least their paired RMS current value differences fall below a maximum, predetermined maximum current difference value, for example 0.3 A. The currents itxk of all active transmitting coils 20 are preferably additionally regulated in such a way that the currents itxk are in phase or at least the relative phase angles beta measured in pairs fall below a maximum, predetermined target phase angle, for example 15°.

A further regulation objective of the energy transfer step 118 is preferably to minimize all currents itxk while at least largely maintaining the total energy transfer power in order to avoid stray fields.

The energy transfer step 118 is also configured such that at least one of the transmitting coils 20 is activated on the basis of the previous detection and/or the localization of the mobile device(s) 12.

The active power of at least one of the activated transmitting coils 20 is monitored. In particular, the strength of at least one current itxk and/or at least one of the relative phase angles beta, measured relative to a reference current in each case, of the currents itxk of at least one of the activated transmitting coils 20 are monitored.

If too little active power is transferred via one of the activated transmitting coils 20 over a certain period of time, this transmitting coil 20 is preferably deactivated. In particular, it is possible to respectively deactivate that previously active transmitting coil 20 with index number k whose transferred active power is the lowest of all active transmitting coils 20 in each case and/or whose transferred active power falls below a minimum active power. This can occur, for example, if the mobile device(s) 12 is/are moved when transferring energy.

Furthermore, provision can be made for inactive transmitting coils 20 to be checked, in particular at regular time intervals, to determine whether a mobile device 12 or a receiving coil 22 is located in their respective energy transfer area. For this purpose, that inactive transmitting coil 20 which has been inactive for the longest time in each case is preferably activated and checked on a trial basis. Such a previously inactive transmitting coil 20 is then activated in the event of a positive check. This can also occur, for example, if the mobile device(s) 12 is/are moved when transferring energy.

In order to regulate the currents itxk, provision is made in the energy transfer step 118 for the respective phase angles alpha and/or the duty factors to be set, in particular by setting the associated pulse widths dk.

In detail, the following sub-steps are provided in the energy transfer step 118:

- 118.1 Activate all nactive transmitting coils 20 identified in step 114, that is to say activate the transmitting coils 20 on the basis of the detection and/or the localization of the at least one mobile device 12. To do this, set a target value for the total energy transfer power, for example 100 W;
- 118.2 Measure the RMS values of all currents itxk of all active transmitting coils 20 and the relative phase angles beta;
- 118.3 Check whether all regulation objectives, in particular relative phase angles beta and RMS current value differences, are met for all currents itxk or all active transmitting coils 20;
- 118.4 If all regulation objectives according to 118.3 are met and if the mean value of all RMS values of all currents itxk of all active transmitting coils 20 exceeds a maximum total current value, for example 4.5 A:
  - 118.4.1 Deactivate at least one previously active transmitting coil 20 that is no longer required. For this purpose, in particular, deactivate those transmitting coils 20 whose transferred active power falls below a predetermined minimum active power, for example 6 W.
  - 118.4.2 In a predefined rhythm, for example every second, activate one of the previously inactive transmitting coils 20 on a trial basis, in particular the transmitting coil 20 which has been inactive for the longest time in each case;
- 118.5 If at least one of the regulation objectives according to 118.3 is not met permanently over a predetermined period of time, for example 2 seconds:
  - 118.5.1 Deactivate at least one previously active transmitting coil 20. For this purpose, deactivate, in particular, that transmitting coil 20 with the lowest drawn power and/or with the lowest transferred active power.
- 118.6 Determine new control parameters:
  - 118.6.1 Calculate a total energy transfer power as the sum of the powers output by the individual transmitting coils 20;
  - 118.6.2 Determine a reference transmitting coil by selecting the transmitting coil 20 with the greatest transferred active power.
  - Parameters of this reference transmitting coil are denoted using index ref below;
  - 118.6.3 Gradually adjust the pulse width $d_{ref}$ of the voltage utxref of the reference transmitting coil on the basis of the difference between the total energy transfer power and the target value for the total energy transfer power, provided that the difference exceeds a relevance threshold, for example 5 W;
  - 118.6.4 For each of the remaining, active transmitting coils 20:
    - 118.6.4.1 Gradually adjust their phase angle alpha if their RMS current value of the current itxk deviates from the RMS current value of the current itxref of the reference transmitting coil beyond a relevance threshold, for example 0.1 A;
    - 118.6.4.2 Gradually adjust their pulse width dk if their phase angle beta relative to the reference transmitting coil deviates beyond a relevance threshold, for example 5°;
- 118.7 Set the control parameters newly determined in sub-step 118.6, in particular the relative phase angles alpha and the duty factors or the associated pulse widths dk, for the purpose of setting pulse width modulation generators which are used to control the DC/AC voltage converters 24 to generate the voltages utxk.

In order to measure the total energy transfer power, mean values of the input currents Iink are measured and multiplied by the feed voltage Uq and the power determined is corrected for power losses, in particular in the form of resistive power losses.

The input currents Iink and the currents itxk are measured by means of rapid sampling using the analog-to-digital converter units, for example with a clock rate of approximately 5 MHz. In this case, a predetermined number of measured values, for example 58 measured values, of each measurement variable, that is to say in particular the input currents Iink and the currents itxk, is respectively recorded for each transmitting coil 20 to be measured and then the process proceeds to the next transmitting coil 20 to be measured. In order to avoid leakage effects, sampling is carried out over an integer multiple of the period duration. The measurements are always started at the beginning of a new period of the voltage utxref of the reference coil in order to ensure a consistent temporal reference point and to be able to calculate relative phase angles beta.

The RMS current values and the relative phase angles beta are determined simplistically from the measured values obtained on the basis of a first-order Fourier series expansion.

Finally, in a decision step 120, the total active power transferred is checked. If it reaches at least a predefined minimum total active power, for example 0.02 kW, the method 100 is continued with sub-step 118.2 of the energy transfer step 118. Otherwise, the method 100 returns to the waiting step 112 again.

Energy is thus transferred until the total energy transfer power and thus the total power consumed by the mobile devices 12 falls below a predefined minimum.

What is claimed is:

1. An energy transfer module for transferring energy to a handheld power tool, wherein the energy is transferred wirelessly, the energy transfer module comprising:

a first transmitting coil and a second transmitting coil, the first transmitting coil operable with a first alternating current and the second transmitting coil operable with a second alternating current, wherein the energy transfer module is configured in such a way that, at least during an energy transfer phase of the energy transfer module, an absolute value of the relative phase angle of the first and second alternating currents flowing in the first and second transmitting coils is not more than 45°;

wherein the energy transfer module is configured in such a way that, at least during the energy transfer phase, RMS current values of the currents flowing in the first and second transmitting coils differ by no more than 10 percent or by no more than 0.3 A.

2. The energy transfer module as recited in claim 1 wherein the energy transfer module is configured, at least during the energy transfer phase of the energy transfer module, to minimize the absolute value.

3. The energy transfer module as recited in claim 1 wherein the RMS current values differ by no more than 6 percent.

4. The energy transfer module as recited in claim 1 wherein the handheld power tool has a receiving coil.

5. The energy transfer module as recited in claim 4 wherein the receiving coil spans a larger area than at least one of the first and second transmitting coils.

6. The energy transfer module as recited in claim 1 wherein the absolute value of the relative phase angle of the first and second alternating currents flowing in the first and second transmitting coils is not more than 15°.

7. A transmitting unit for a handheld power tool comprising: at least one transmitting coil operable with an alternating current and a communication interface, via which at least one piece of information relating to a target phase angle of the current flowing in the transmitting coil or a relative target phase angle can be transmitted, wherein the transmitting unit is for the energy transfer module as recited in claim 1, the at least one transmitting coil being of the first transmitting coil and the second transmitting coil.

8. An energy transfer system comprising: at least one energy transfer module as recited in claim 1 and at least one transmitting unit having at least one further transmitting coil operable with an alternating current and a communication interface, via which at least one piece of information relating to a target phase angle of the current flowing in the further transmitting coil or a relative target phase angle can be transmitted.

9. An energy transfer module for transferring energy to a handheld power tool, wherein the energy is transferred wirelessly, the energy transfer module comprising:

a first transmitting coil and a second transmitting coil, the first transmitting coil operable with a first alternating current and the second transmitting coil operable with a second alternating current, wherein the energy transfer module is configured in such a way that, at least during an energy transfer phase of the energy transfer module, an absolute value of the relative phase angle of the first and second alternating currents flowing in the first and second transmitting coils is not more than 45°;

wherein the energy transfer module is configured in such a way that, at least during the energy transfer phase, a voltage assigned to the first or second alternating current is pulse-width-modulated.

10. The energy transfer module as recited in claim 9 wherein the voltage has a square wave pulse.

11. An energy transfer module for transferring energy to a handheld power tool, wherein the energy is transferred wirelessly, the energy transfer module comprising:

a first transmitting coil and a second transmitting coil, the first transmitting coil operable with a first alternating current and the second transmitting coil operable with a second alternating current, wherein the energy transfer module is configured in such a way that, at least during an energy transfer phase of the energy transfer module, an absolute value of the relative phase angle of the first and second alternating currents flowing in the first and second transmitting coils is not more than 45°;

wherein the first transmitting coil and the second transmitting coil are each integrated in at least one electrical resonant circuit with a respective resonant frequency, wherein the resonant frequencies differ by no more than 10 percent.

12. The energy transfer module as recited in claim 11 wherein the resonant frequencies differ by no more than 1 percent.

13. An energy transfer module for transferring energy to a handheld power tool, wherein the energy is transferred wirelessly, the energy transfer module comprising:

a first transmitting coil and a second transmitting coil, the first transmitting coil operable with a first alternating current and the second transmitting coil operable with a second alternating current, wherein the energy transfer module is configured in such a way that, at least during an energy transfer phase of the energy transfer module, an absolute value of the relative phase angle of the first and second alternating currents flowing in the first and second transmitting coils is not more than 45°;

wherein at least one of the first and second transmitting coils is individually activatable and deactivatable.

14. A method for operating a transmitting unit for a handheld power tool comprising: at least two transmitting coils operable with an alternating current and a communication interface, via which at least one piece of information relating to a target phase angle of the current flowing in the at least two transmitting coils or a relative target phase angle can be transmitted, the method comprising the steps of:

a. detecting and locating the handheld power tool;

b. activating at least one of the at least two transmitting coils on the basis of the detection or the localization of the handheld power tool; and c. monitoring a transferred active power of at least one activated transmitting coil of the at least two transmitting coils or, if at least two transmitting coils of the at least two transmitting coils are activated, a relative phase angle of the currents flowing in the at least two activated transmitting coils.

15. The method as recited in claim 14 wherein in addition to the activation according to step b, at least one further inactive transmitting coil of the at least two transmitting coils is activated.

16. The method as recited in claim 14 wherein the at least one transmitting coil is activated which has been inactive for the longest time prior to activation.

17. The method as recited in claim 14 wherein an active transmitting coil is deactivated during the monitoring according to step c.

18. The method as recited in claim 17 wherein the active transmitting coil whose transferred active power is the lowest of all active transmitting coils or whose transferred active power falls below a minimum active power is deactivated.

19. The method as recited in claim 14 wherein a phase angle between at least two voltages assigned to the respective alternating currents or a duty factor of at least one active transmitting coil is set.

20. The method as recited in claim 19 wherein the phase angle between the at least two voltages or the duty factor of all active transmitting coils is set.

21. The method as recited in claim 14 further comprising coupling a further energy transfer module or a further transmitting unit to the energy transfer module or to the transmitting unit.

22. The method as recited in claim 14 wherein the at least two transmitting coils have a smaller transmission range than a reception range of at least one receiving coil of the handheld power tool.

* * * * *